United States Patent [19]

Fujisawa et al.

[11] Patent Number: 5,468,567
[45] Date of Patent: * Nov. 21, 1995

[54] SLIDE MEMBER

[75] Inventors: Yoshikazu Fujisawa; Takeshi Narishige; Yuzuru Miyazaki, all of Saitama, Japan

[73] Assignee: Honda Giken Kogyo Kabushiki Kaisha, Tokyo, Japan

[*] Notice: The portion of the term of this patent subsequent to May 10, 2011, has been disclaimed.

[21] Appl. No.: 240,018

[22] Filed: May 9, 1994

Related U.S. Application Data

[63] Continuation of Ser. No. 989,733, Dec. 10, 1992, Pat. No. 5,310,606, which is a continuation of Ser. No. 642,812, Jan. 18, 1991, abandoned.

[30] Foreign Application Priority Data

| Jan. 19, 1990 | [JP] | Japan | 2-10119 |
| Jan. 19, 1990 | [JP] | Japan | 2-10120 |
| Jan. 19, 1990 | [JP] | Japan | 2-10121 |

[51] Int. Cl.$^6$ .................................................. F16C 33/12
[52] U.S. Cl. .................................................. 428/645
[58] Field of Search ................... 428/643, 644, 428/645, 687, 935; 384/912, 913, 625

[56] References Cited

U.S. PATENT DOCUMENTS

| 2,586,099 | 2/1952 | Schultz | 428/645 |
| 2,741,016 | 4/1956 | Roach | 428/645 |
| 4,470,184 | 9/1984 | Fukuoka et al. | 384/913 |
| 4,528,079 | 7/1985 | Badger | 384/293 |
| 4,832,801 | 5/1989 | Mori | 204/44.4 |
| 4,900,639 | 2/1990 | Hodes et al. | 428/610 |
| 4,937,149 | 6/1990 | Mori | 428/645 |

FOREIGN PATENT DOCUMENTS

| 366418 | 4/1982 | Austria . |
| 0218772 | 10/1985 | European Pat. Off. . |
| 52-35775 | 3/1977 | Japan . |
| 750557 | 6/1956 | United Kingdom . |
| 1295997 | 11/1972 | United Kingdom . |
| 2060692 | 5/1981 | United Kingdom . |
| 2084609 | 4/1982 | United Kingdom . |
| 2084191 | 4/1982 | United Kingdom | 204/44.4 |
| 2117403 | 10/1983 | United Kingdom . |
| WO89/1094 | 2/1989 | WIPO | 384/912 |

OTHER PUBLICATIONS

R. Fratesi et al., "Electrodeposition of Lead Alloys from Fluoborate Baths", Journal of Applied Electrochemistry, 14, (1984), pp. 505–510 no month.
J. Azzdino, "Lead–Tin Alloy Plating for Aircraft Engine Components", Plating, Nov. 1957, pp. 130–132.
G. B. Rynne, "New Dimension in Tin–Lead Plating", Plating, Sep. 1971, vol. 58, No. 9, pp. 867, 899, 72, 74, 76.

Primary Examiner—John Zimmerman
Attorney, Agent, or Firm—Lyon & Lyon

[57] ABSTRACT

A slide member includes a surface layer of a Pb alloy on a slide surface for a mating member, and the crystal form of the Pb alloy is formed such that the orientation index in a (h00) plane by Miller indices is in a range of 50 to 100%.

13 Claims, 10 Drawing Sheets

SLIDE MEMBER

This is a continuation of application Ser. No.07/989,733, filed on Dec. 10, 1992, now U.S. Pat. No. 5,310,606, which is a continuation of application Ser. No. 07/642,812, filed Jan. 18, 1991, now abandoned.

BACKGROUND OF THE INVENTION

1. Field of the Invention

The field of the present invention is slide members and more particularly, improvement in slide members of the type having a surface layer of a Pb alloy on a slide surface for a mating member.

2. Description of the Prior Art

There are conventionally known slide bearings as a slide member of such type, comprising a surface layer formed of a Pb—Sn based alloy (see Japanese Patent Application Laid-open No. 96088/81).

Such a slide bearing has been applied to a journal portion of a crankshaft in an engine, an enlarged end of a connecting rod, or the like. Under existing circumstances where there is a tendency of increasing speed and output of an engine, however, prior art slide members suffer from a problem that they merely show a poor seizure resistance of the surface layer thereof. This is primarily due to the crystal form of Pb—Sn based alloy forming the surface layer, the crystal form being a form with crystal faces oriented at random. In addition, from a viewpoint of improvement in seizure resistance, it is necessary to improve the oil retention characteristic of the surface layer.

SUMMARY OF THE INVENTION

It is an object of the present invention to provide a slide member of the type described above, wherein the seizure resistance of the surface layer can be increased by the crystal from of a Pb alloy.

It is another object of the present invention to provide a slide member of the type described above, wherein the oil retension characteristic of the surface layer can be improved by specifying the form, geometric shape and size of the crystal of a Pb alloy, thereby increasing the seizure resistance of the surface layer.

It is a further object of the present invention to provide a slide member of the type described above, wherein the seizure resistance of the surface layer can be increased by specifying the amount of Sn incorporated based on Pb and specifying the crystal form of a Pb alloy.

To achieve the above objects, according to the present invention, there is provided a slide member comprising a surface layer of a Pb alloy on a slide surface for a mating member, wherein the crystal form of the Pb alloy is formed, so that the orientation index in a (h00) plane by Miller indices is in a range of 50 to 100%.

If the orientation index in the (h00) plane is set in the above-described range, the seizure resistance of the surface layer can be increased. However, if the orientation index is lower than 50%, a satisfactory seizure resistance is not obtained.

In addition, according to the present invention, there is provided a slide member comprising a surface layer of a Pb alloy on a slide surface for a mating member, wherein the crystal form of the Pb alloy is formed, so that the orientation index in a (h00) plane by Miller indices is in a range of 50 to 100%, and wherein the crystal of the Pb alloy formed into a pyramid share with its apex directed to the slide surface and having a base length of 8 μm or less.

If the form, geometric shape and size of the crystal of the Pb alloy forming the slide surface of the surface layer are specified as described above, the oil retension characteristic of the surface layer can be improved, thereby providing an increased seizure resistance.

However, if the base length of the pyramid exceeds 8 μm, the oil retension characteristic of the surface layer is degraded, resulting in a reduced seizure resistance.

Further, according to the present invention, there is provided a slide member wherein the Pb alloy contains 3% (inclusive) to 20% (inclusive) by weight of Sn.

If the Sn content and the crystal form in the Pb alloy are specified as described above, the seizure resistance of the surface layer can be increased, and the surface layer can be provided with a fatigue resistance.

However, if the Sn content is less than 3% by weight, the fatigue resistance of the surface layer is reduced. If the Sn content exceeds 20% by weight, the seizure resistance of the surface layer is reduced.

The above and other objects, features and advantages of the invention will become apparent from reading the following description of the preferred embodiments, taken in conjunction with the accompanying drawings.

DESCRIPTION OF THE PREFERRED EMBODIMENTS

Figure 1:
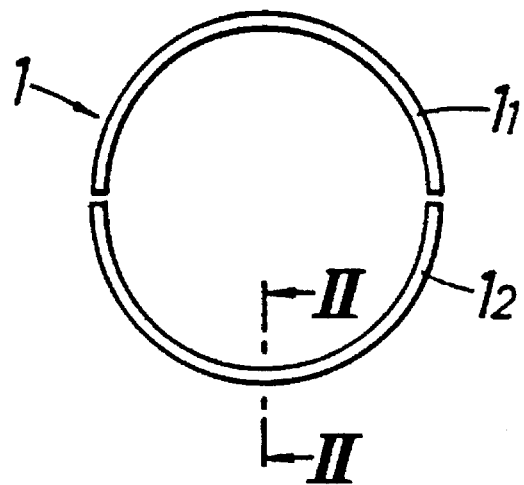
FIGS. 1 and 2 illustrate a slide bearing, FIG. 1 being an exploded plan view, and FIG. 2 being a sectional view taken along a line II—II in FIG. 1.
Figure 2:
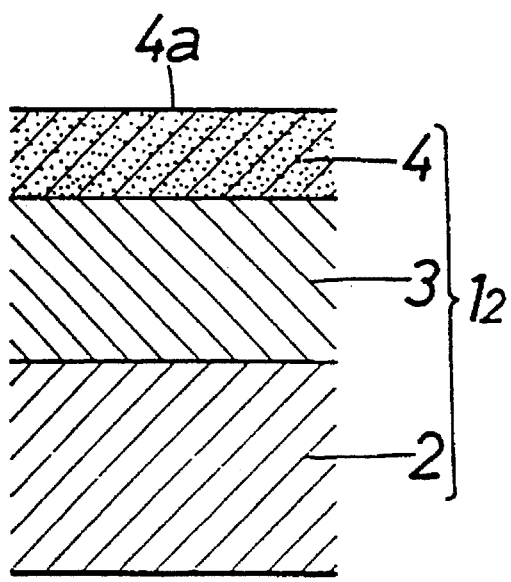

Referring to FIGS. 1 and 2, a slide bearing 1 as a slide member is applied to a journal portion of a crankshaft in an engine, an enlarged end of a connecting rod or the like comprises a half first $1_1$ and a second half $1_2$. The halves $1_1$ and $1_2$ have the same structure and each includes a backing 2, a lining layer 3 formed on a slide surface of the backing 2 for a mating member, and a surface layer 4 formed on a surface of the lining layer 3. Optionally, a copper plating layer may be provided between the backing 2 and the lining layer 3, and a nickel plating barrier layer may be provided between the lining layer 3 and the surface layer 4.

The backing 2 is formed from a rolled steel plate and the thickness of the backing depends upon the set thickness of the slide bearing 1. The lining layer 3 is formed form copper, a copper-based alloy, aluminum, an aluminum-based alloy, etc., and the thickness of the lining layer is in a range of 50 to 500 μm and normally on the order of 300 μm. The surface layer 4 is formed from a Pb alloy, and the thickness of the surface layer is in a range of 5 to 50 μm and normally on the order of 20 μm.

The Pb alloy forming the surface layer 4 contains 80% (inclusive) to 90% (inclusive) by weight of Pb, and 3% (inclusive) to 20% (inclusive) by weight of Sn and if necessary, may contain at most 10% by weight of at least one element selected from the group consisting of Cu, In and Ag.

Cu has a function to increase the hardness of the surface layer 4, but if the Cu content exceeds 10% by weight, the resulting surface layer has an excessively high hardness, which will cause an increased amount of wear in a mating member. When Cu is added, it is desirable that the Cu content is adjusted such that the hardness Hmv of the resulting surface layer 4 is in a range of 17 to 20.

In and Ag have a function to soften the surface layer 4 to provide an improved initial conformability. However, if the content of In and/or Ag exceeds 10% by weight, the resulting surface layer 4 has a reduced strength. When In and/or Ag are added, it is desirable to adjust the content of In and/or Ag such that the hardness Hmv of the resulting surface layer 4 is in a range of 12 to 15.

The surface layer 4 is formed by an electro-plating process. The plating solution used is a borofluoride-based plating solution containing 40 to 180 g/l of $Pb^{2+}$ and 1.5 to 35 g/l of $Sn^{2+}$ and optionally, at most 15 g/l of $Cu^{2+}$. The temperature of the plating solution is set in a range of 10 to 35° C., and the cathode current density is set in a range of 2 to 15 A/dm².

Figure 3:
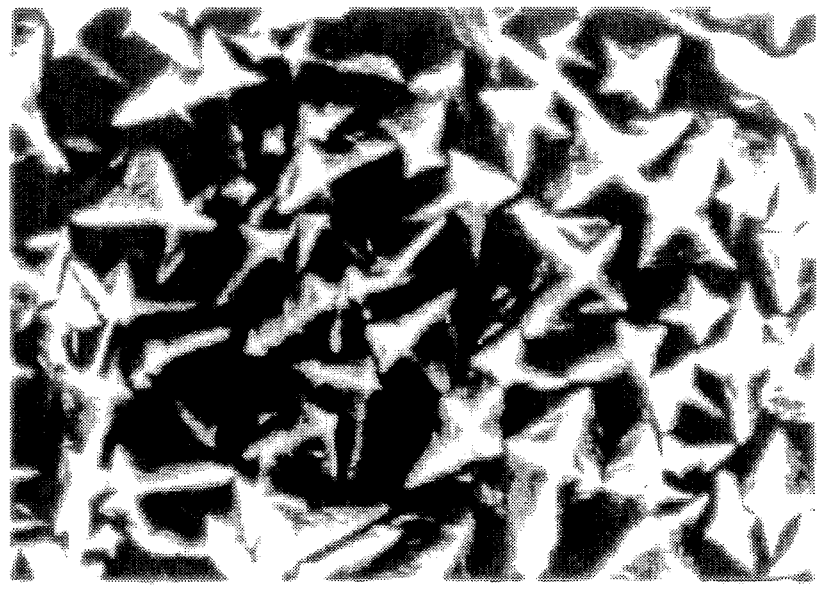
FIG. 3 is a photomicrograph showing a metallographic structure of a surface layer in accordance with the present invention.

FIG. 3 is an electronic photomicrograph (10,000 times) showing a metallographic structure on a slide surface 4a of the surface layer 4. The surface layer 4 was made of a Pb alloy containing 8% by weight of Sn and 2% by weight of Cu. The surface layer 4 was formed on a lining layer 3 made of a Cu alloy, and the cathode current density was set at 8 A/dm² in an electro-plating treatment in forming the surface layer 4.

The crystal of the Pb alloy in the slide surface 4a assumes a pyramid form with its apex directed to a meeting member with which the slide surface 4a slides e.g., a quadrangular pyramid form in the illustrated embodiment, and four slanting surfaces thereof belong to surfaces parallel to a (111) plane by Miller indices.

Figure 4:
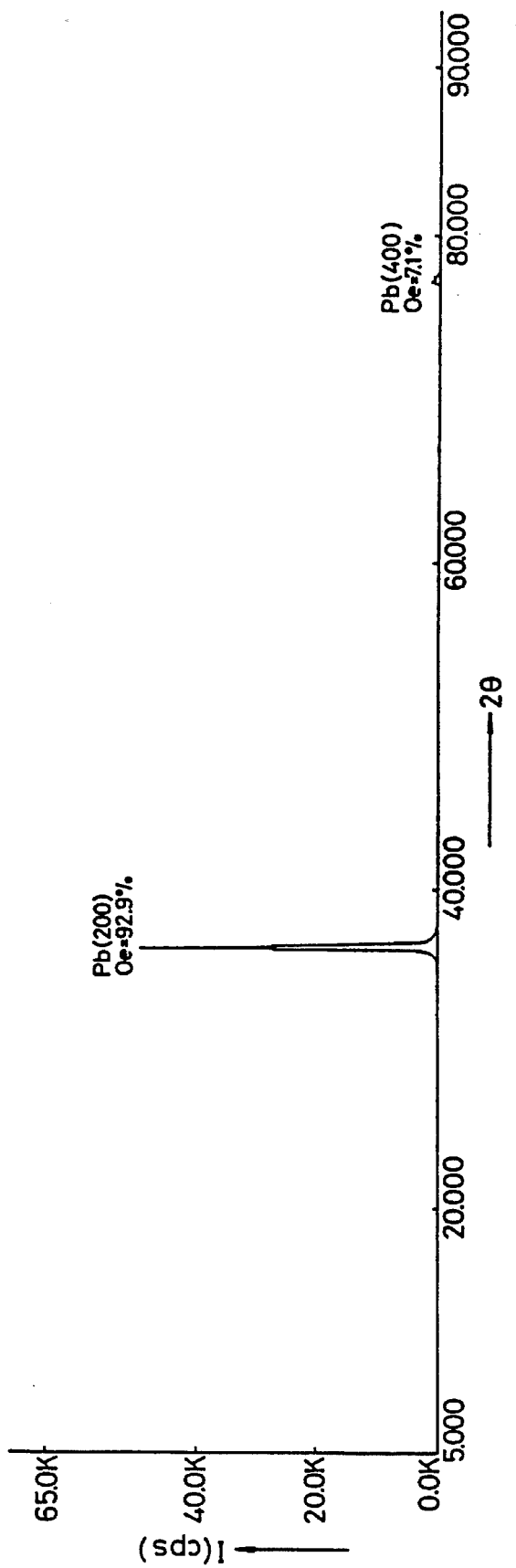
FIG. 4 is a pattern diagram of an X-ray diffraction for a Pb alloy forming the surface layer in accordance with the present invention.

FIG. 4 is a pattern diagram of an X-ray diffraction for the Pb alloy, wherein only diffraction peaks of planes with Miller indices (200) and (400) are observed.

An orientation index Oe, which is an index indicative of the orientation of the crystal faces, is defined as follows:

$$Oe = Ihkl/\Sigma Ihkl \times 100 \; (\%)$$

wherein hkl is a Miller indices of a plane Ihkl is an integrated strength of a (hkl) plane; and ΣIhkl is a sum of Ihkl. The nearer to 100% the orientation index in a certain (hkl) plane is, the more the crystal faces oriented in a direction perpendicular to the (hkl) plane.

The integrated strength Ihkl and the orientation index Oe in the (200) and (400) planes of the Pb alloy are as given in Table 1 below.

TABLE 1

| hkl | Integrated strength Ihkl | Orientation index Oe (%) |
|---|---|---|
| 200 | 631,414 | 92.9 |
| 400 | 48,582 | 7.1 |

As apparent from Table 1, the orientation index in the (h00) plane of the Pb alloy is of 100% and hence, the Pb alloy has a crystal faces oriented in axial directions in crystal axes a, b and c, i.e., (h00) planes.

Figure 5:
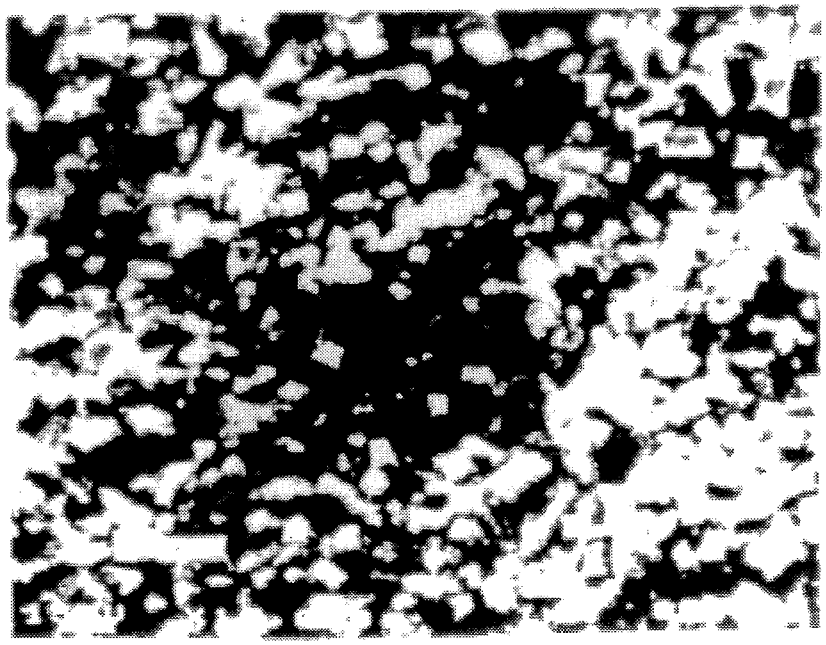
FIG. 5 is a photomicrograph showing a metallographic structure of a surface layer of the prior art.

FIG. 5 is an electronic photomicrograph (10,000 times) showing a metallographic structure in a slide surface of a prior art surface layer. The surface layer is made of a Pb alloy containing 8% by weight of Sn and 2% by weight of Cu. The surface layer is formed on a lining layer of a Cu alloy by an electro-plating treatment and may be applied to a journal portion of a crankshaft for an engine.

Figure 6:
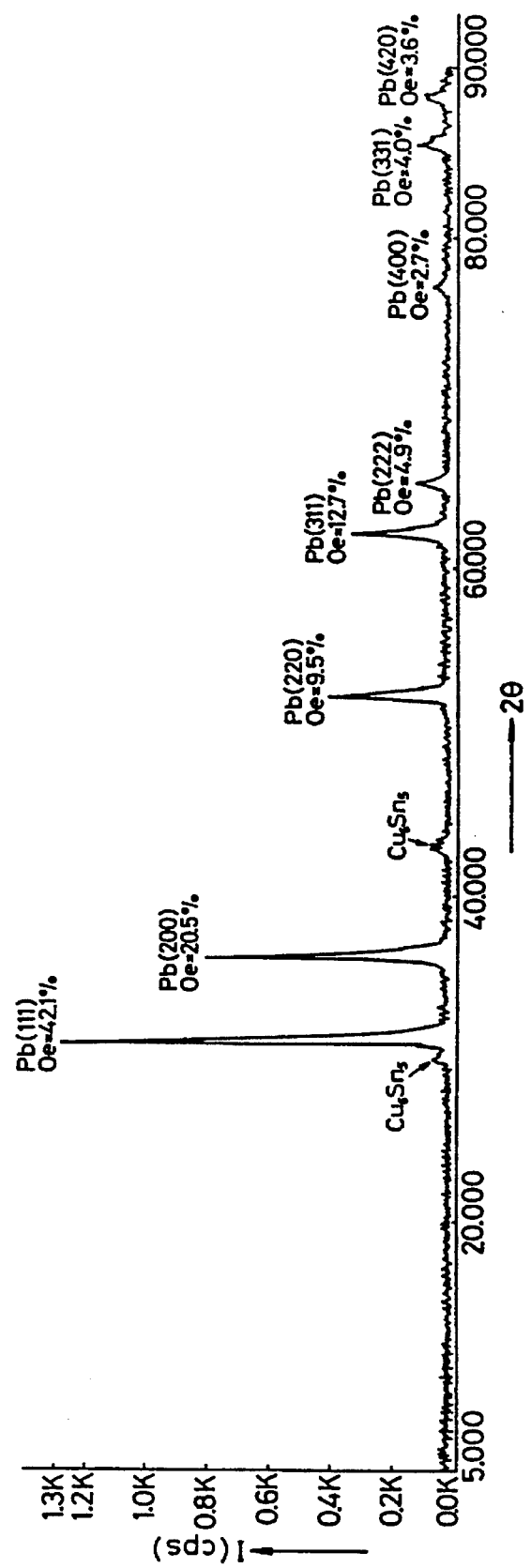
FIG. 6 is a pattern diagram of an X-ray diffraction for a Pb alloy forming the surface layer of the prior art.

FIG. 6 is a pattern diagram of an X-ray diffraction for prior art Pb alloy. In FIG. 6 the orientation to a specific crystal face is not observed. The integrated strength Ihkl and the orientation index Oe in various (hkl) planes are as given in Table II below.

TABLE II

| hkl | Integrated strength Ihkl | Orientation index Oe (%) |
|---|---|---|
| 111 | 31,987 | 42.1 |
| 200 | 15,548 | 20.5 |
| 220 | 7,233 | 9.5 |
| 311 | 9,609 | 12.7 |
| 222 | 3,730 | 4.9 |
| 400 | 2,083 | 2.7 |
| 331 | 3,038 | 4.0 |
| 420 | 2,723 | 3.6 |

As apparent from FIG. 5 and Table II, the crystal form of the prior art Pb alloy is a form with crystal faces orientated at random and hence, the geometric shape of the crystal in the slide surface is an indetermined shape including a pyramid form partially.

Table III compares the composition and orientations and therefore the orientation index of the surface layer of various slide bearings.

TABLE III

| Chemical Constituent (% by weight) | | | | Orientation index Oe (%) | | | | | Thickness (μm) | Current density of cathode (A/dm²) |
| --- | --- | --- | --- | --- | --- | --- | --- | --- | --- | --- |
| Sn | Cu | In | Pb | (h00) | (111) (222) | (220) | (311) | (another) | | |
| Examples of the present invention | | | | | | | | | | |
| I    | 8   | 2 | —   | Balance | 100  | —    | —    | —    | —   | 20 | 8  |
| II   | 8   | 2 | —   | Balance | 60   | 28.5 | 4.2  | 1.1  | 6.2 | 20 | 3  |
| III  | 8   | 2 | —   | Balance | 80.1 | 13.8 | 1.3  | 1.2  | 3.6 | 20 | 4  |
| IV   | 7.5 | — | 5.5 | Balance | 100  | —    | —    | —    | —   | 20 | 10 |
| V    | 7.5 | — | 5.5 | Balance | 80   | 24.2 | 1.5  | 1.5  | 2.8 | 20 | 6  |
| VI   | 7.5 | — | 5.5 | Balance | 50   | 36.3 | 3.6  | 3.6  | 6.5 | 20 | 2  |
| Comparative examples | | | | | | | | | | |
| VII  | 8   | 2 | —   | Balance | 23.2 | 47   | 9.5  | 12.7 | 7.6  | 20 | — |
| VIII | 7.5 | — | 5.5 | Balance | 14.6 | 28.6 | 28.8 | 16.9 | 11.1 | 20 | — |

The example I of the present invention corresponds to the Pb alloy (FIG. 3) in the above-described embodiment of the present invention.

The examples II and III of the present invention have decreased cathode current density values, as compared with the example I and hence, have correspondingly reduced orientation indexes Oe in the (h00) plane.

The example IV of the present invention includes a surface layer formed from a Pb—Sn—In based alloy and has an orientation index of 100% in the (h00) plane.

The examples V and VI of the present invention have an increased current density of a cathode, as compared with the example IV and hence, have correspondingly reduced orientation indices Oe in the (h00) plane.

The comparative example VII corresponds to the conventional Pb alloy (FIG. 5) and the cathode current density thereof cannot be determined.

The comparative example VIII has the same composition as the examples IV to VI of the present invention, but the cathode current density thereof cannot be determined.

Figure 7:
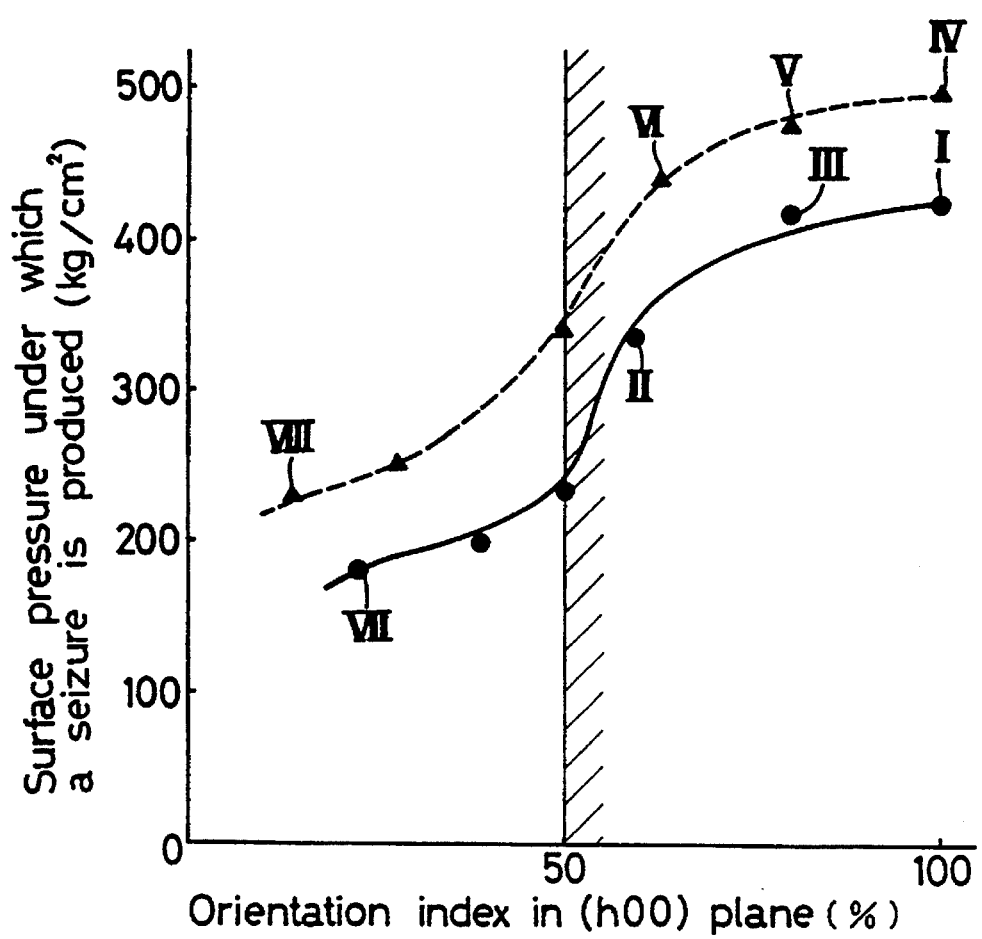
FIG. 7 is a graph illustrating a relationship between the orientation index in a (h00) plane and the surface pressure under which seizure is produced.

FIG. 7 illustrates the results of a seizure test conducted for the examples I to VI of the present invention and the comparative examples VII and VIII.

The seizure test was carried out by bringing each of the slide bearings into slide contact with a rotary shaft and gradually increasing the load applied to the slide bearing, and FIG. 7 is a graph illustrating surface pressures determined when a seizure was produced in the surface layer of each slide bearing.

The test conditions are as follows: The material used for the rotary shaft was a nitrided JIS S48C material, and the number of revolutions of the rotary shaft was 6,000 rpm; the oil supply temperature was of 120° C., the oil supply pressure was 3 kg/cm²; and an applied load was 1 kg/sec.

As apparent from FIG. 7, the examples I to III and IV and VI of the present invention are excellent in seizure resistance as compared with the comparative examples VII and VIII.

This is attributable to the crystal form of the Pb alloy in the surface layer. More specifically, this is because in examples I to VI of the present invention, the crystal form of the Pb alloy is such that the orientation index Oe in the (h00) plane is at least 50%, but in comparative examples VII and VIII, the crystal form of the Pb alloy is such that its crystal faces are oriented at random.

In order to increase the seizure resistance of the surface layer 4, the orientation index Oe in the (h00) plane is set in a range of 50 to 100% as described above and preferably at least at 60%. Especially, when requiring seizure resistance under a severe condition, the orientation index Oe in the (h00) plane is set at a minimum of 97%.

Figure 8:
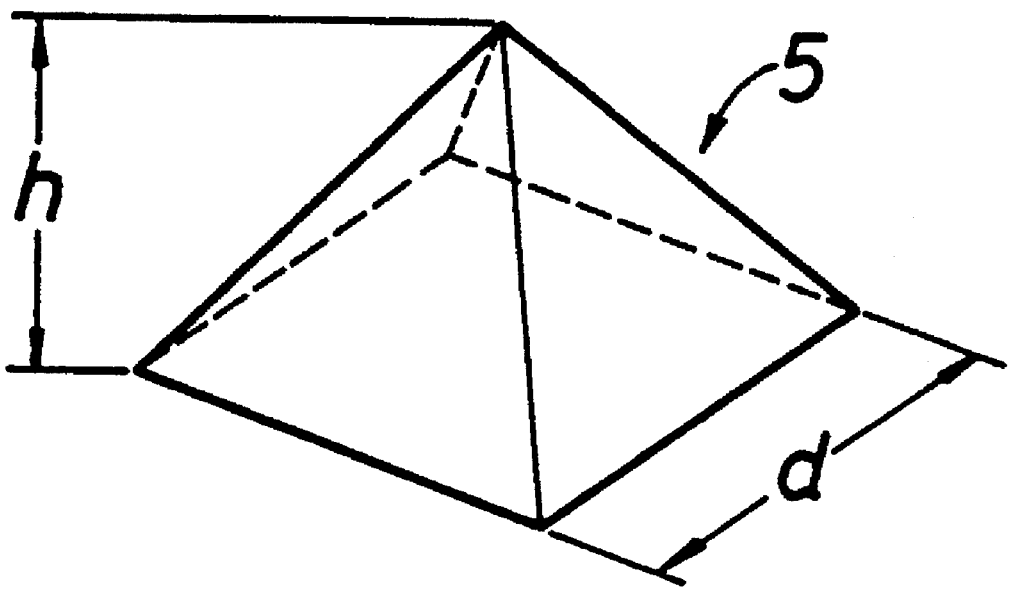
FIG. 8 is a perspective view of a quadrangular pyramid.

As shown in FIG. 8, in a quadrangular pyramid 5 made of a Pb alloy, the length d of the base is set at 8 μm or less, preferably in a range of 0.5 to 6 μm. The ratio h/d of the height h to the length d of the base of the quadrangular pyramid 5 is set in a range of 0.2 to 1.0, preferably 0.33 to 0.8. The size of such a pyramid depends upon the cathode current density As the cathode current density is increased, the pyramid 5 grows large.

The oil retension characteristic of the surface layer 4 can be improved by setting the form, geometric shape and size of the crystal of the Pb alloy in the above-described manner. Table IV compares the composition; crystal orientation, and therefore the orientation index Oe of the (h00) plane; geometric shape and size of the surface layer of various slide bearings.

TABLE IV

| Chemical Constituent (% by weight) | | | Oe (%) in (h00) plane | Crystal | | | | Thickness (μM) | Current density of cathode (A/dm²) |
| --- | --- | --- | --- | --- | --- | --- | --- | --- | --- |
| Sn | Cu | Pb | | Geometric shape | size (μm) d | h | h/d | | |

Examples

TABLE IV-continued

| Chemical Constituent (% by weight) | | | Oe (%) in (h00) plane | Crystal | | | | Thickness (μM) | Current density of cathode (A/dm²) |
|---|---|---|---|---|---|---|---|---|---|
| | | | | Geometric shape | size (μm) | | | | |
| Sn | Cu | Pb | | | d | h | h/d | | |
| of the present invention | | | | | | | | | |
| IX | 8 | 2 | Balance | 100 | QA. pyramid | 2.2 | 1.0 | 0.45 | 20 | 6 |
| X | 8 | 2 | Balance | 100 | QA. Pyramid | 2.4 | 1.5 | 0.63 | 20 | 8 |
| XI | 8 | 2 | Balance | 100 | QA. pyramid | 2.7 | 2.0 | 0.74 | 20 | 10 |
| XII | 10.5 | 2.5 | Balance | 100 | QA. pyramid | 0.85 | 0.7 | 0.82 | 20 | 3 |
| Comparative examples | | | | | | | | | |
| XIII | 8 | 2 | Balance | 23.2 | Indetermined shape | 0.5 | — | — | 20 | — |
| XIV | 10 | 2.5 | Balance | 50.2 | Indetermined shape | 0.5 | — | — | 20 | — |

QA. pyramid = Quadrangular pyramid

The example IX of the present invention corresponds to a Pb alloy similar to the example shown in FIG. 3 (except for the to cathode current density of 6 A/dm²).

Examples X and XI of the present invention correspond to Pb alloys with an increased cathode current density as compared with example IX of the present invention, and example XII of the present invention corresponds to a Pb alloy with a reduced cathode current density as compared with example IX of the present invention.

Comparative example XIII corresponds to a Pb alloy similar to the example shown in FIG. 5, the geometric shape of the crystal thereof is an unstable shape, which includes a partial amount of quadrangular pyramids, but the cathode current density thereof cannot be determined.

In comparative example XIV, the composition thereof is substantially the same as that of example XII of the present invention. The geometric shape of the crystal, however, is substantially the same as that of comparative example XIII, but the cathode current density cannot be determined.

Figure 9:
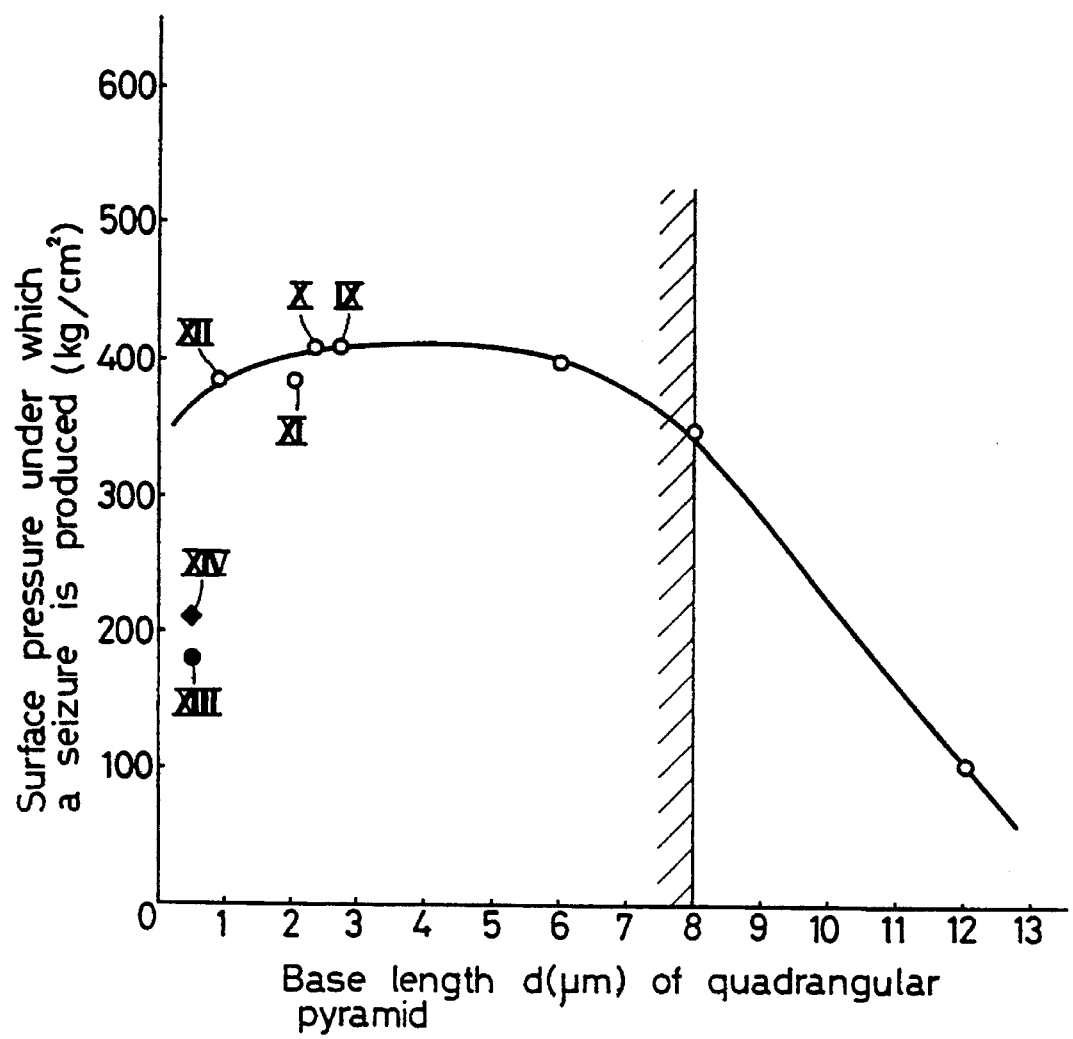
FIG. 9 is a graph illustrating a relationship between the base length d of the quadrangular pyramid and the surface pressure under which seizure is produced.
Figure 10:
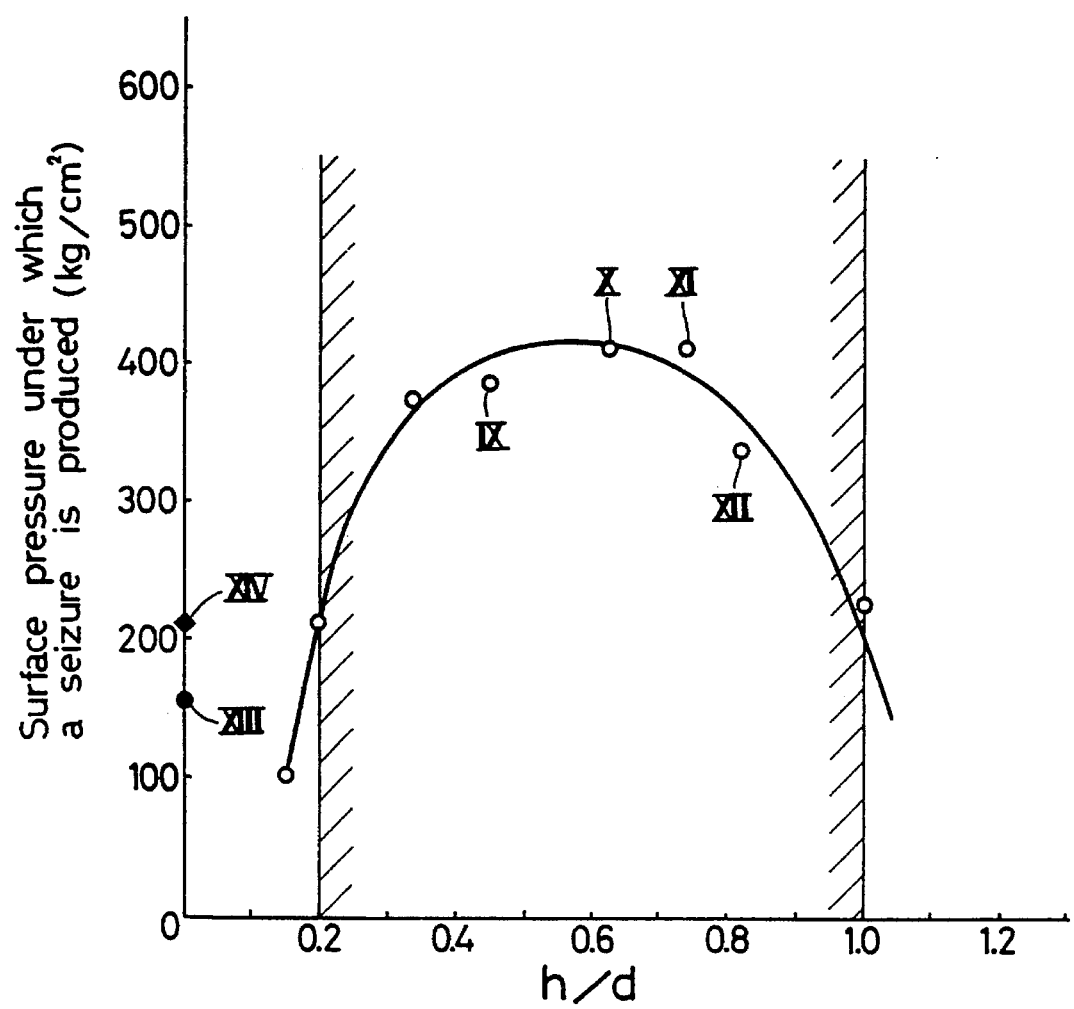
FIG. 10 is a graph illustrating a relationship between the ratio h/d and the surface pressure under which seizure is produced.

FIGS. 9 and 10 illustrate the results of seizure tests conducted for examples IX to XII of the present invention and comparative examples XIII and XIV. FIG. 9 illustrates a relationship of seizure with respect to the length d of the base of the quadrangular pyramid, and FIG. 10 illustrates a relationship of seizure with respect to the length d and height h, i.e., to h/d. The ratio of the procedure and conditions of the seizure tests are the same as those shown in FIG. 7.

As apparent from FIGS. 9 and 10, in the examples IX and XII of the present invention, the oil retension characteristics can be increased to provide an excellent seizure resistance as compared with those of the example XIII and XIV by making the crystal of the Pb alloy forming the slide surface 4a of the surface layer 4 as quadrangular pyramids 5 and setting the length of the base of each pyramid 8 μm or less, preferably in a range of 0.5 to 6 μm and setting the ratio h/d of the height h to the base length d in a range of 0.2 to 1.0 preferably 0.33 to 0.8.

Table V compares the composition and crystal orientation, i.e., the orientation index Oe and the like, of the surface layers of various slide bearings.

TABLE V

| | Chemical Constituent (% by weight) | | | | Orientation index Oe (%) | | | | Thickness (μm) | Hardness (Hmv) |
|---|---|---|---|---|---|---|---|---|---|---|
| | Sn | Cu | In | Pb | (h00) | (111) | (220) | (another) | | |
| Examples of the present Invention | | | | | | | | | | |
| XV | 8 | 2 | — | Balance | 100 | — | — | — | 20 | 18 |
| XVI | 8.5 | 1.5 | — | Balance | 100 | — | — | — | 20 | 19 |
| XVII | 7.5 | — | 5.5 | Balance | 100 | — | — | — | 20 | 14 |
| Comparative examples | | | | | | | | | | |
| XVIII | 8 | 2 | — | Balance | 23.2 | 42.1 | 9.5 | 25.2 | 20 | 15.5 |
| XIX | 7.5 | — | 5.5 | Balance | 14.6 | 26.7 | 28.8 | 29.9 | 20 | 11 |
| XX | — | — | — | — | — | — | — | — | — | — |

The example XV of the present invention corresponds to a Pb alloy similar to the example shown in FIG. 3 (except that the cathode current density is of 8 A/dm²).

In example XVI of the present invention, the cathode current density was changed to 10 A/dm² as compared with the example XV and therefore differs from the latter in composition of the surface layer. The hardness of the example XVI is increased as compared with the example XV of the present invention.

Example XVII of the present invention corresponds to a Pb—Sn—In alloy formed by plating of Pb—Sn alloy on a lining layer of a Cu alloy, plating In thereon and subjecting it to thermal diffusion treatment. The temperature of the thermal diffusion was of 150° C., and the period of time thereof was one hour.

Example XVIII of the present invention corresponds to a Pb alloy similar to the example shown in FIG. 5.

Comparative example XIX has the same composition as the example XVII of the present invention.

Comparative example XX has no surface layer and includes a slide surface provided by a lining layer made of an aluminum alloy. The aluminum alloy contains 1.7% by weight of Pb, 12% by weight of Sn, 0.7% by weight of Cu, 0.3% by weight of Sb, and 2.5% by weight of Si.

Figure 11:
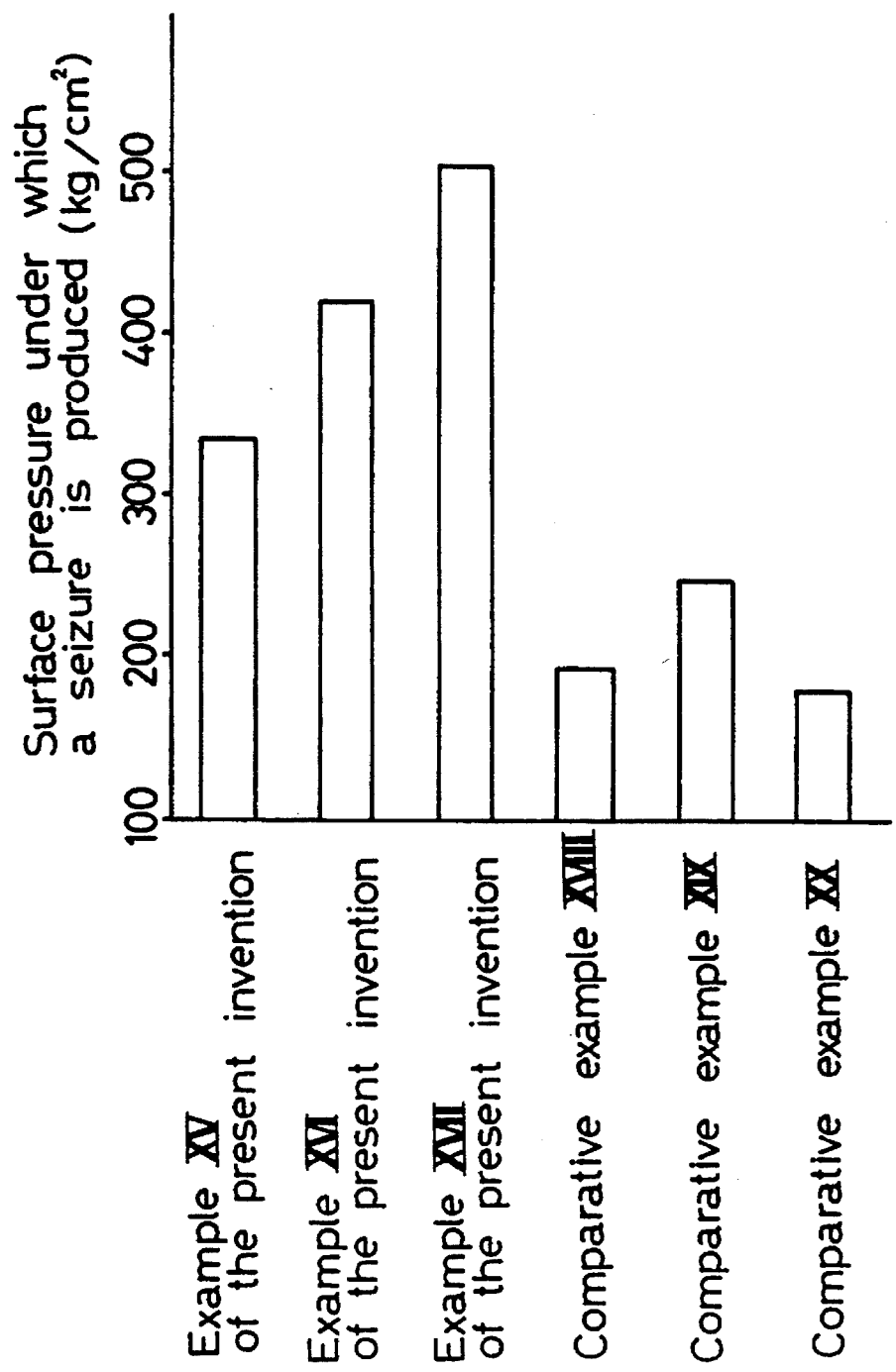
FIG. 11 is a graph illustrating the results of a seizure tests.

FIG. 11 illustrates the results of seizure tests for examples XV of XVII of the present invention and comparative examples XVIII to XX. The procedure and conditions of the tests are the same as those in FIG. 7.

As apparent from FIG. 11, the examples XV to XVII of the present invention are excellent in seizure resistance as compared with the comparative examples XVIII and XIX.

This is attributable to the composition and the crystal form of the Pb alloy in the surface layer. More specifically, this is because in examples XV to XVII of the present invention, the Pb alloy contains 3% (inclusive) to 20% (inclusive) by weight of Sn and at most 10% by weight of at least one element selected from the group consisting of Cu, In and Ag and at the same time, the crystal form of the Pb alloy has an orientation index of 100% in the (h00) plane and has crystal faces oriented in a single direction. By contrast, in the comparative examples XVIII and XIX, the composition is the same as the examples of the present invention, but the crystal form of their Pb alloy has crystal faces oriented at random, and for this reason, the seizure resistance of comparative examples XVIII and XIX is inferior.

Figure 12:
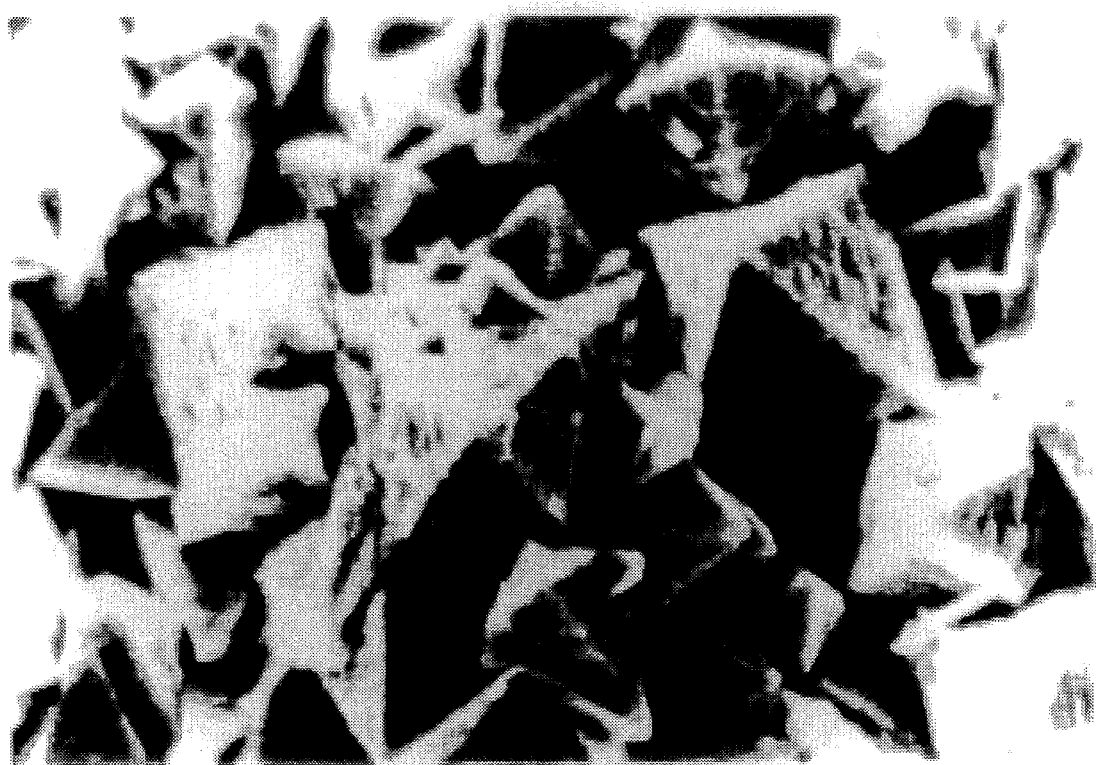
FIG. 12 is a photomicrograph showing a metallographic structure of another surface layer in accordance with the present invention.

FIG. 12 illustrates another example of a surface layer in the present invention. The composition of the Pb alloy thereof is the same as the example XV of the present invention, but the cathode current density is set at 10 A/dm$^2$ which is higher than that of the example XV of the present invention.

The magnification of this electronic microphotography is 10,000 times, which is the same as that of FIG. 3, but it can be seen that attendant upon an increase in cathode current density, quadrangular pyramids grew larger than those. The crystal orientation of this Pb alloy is such that of FIG. 3. orientation index Oe is 97.5% in the (h00) plane and 1.3% in the (111) plane, and the crystal form thereof crystal faces are oriented in a substantially single direction.

It should be noted that when Ag is incorporated into the surface layer, a method is employed in which an electroplating treatment is conducted using a plating solution containing Pb and Sn ions with Ag ion added thereto. In addition, it will be understood that the present invention is not limited to slide bearings and is applicable to other type of slide members.

What is claimed is:

1. A slide member comprising a surface layer of a Pb alloy on a slide surface for a mating member, wherein said Pb alloy has a crystal form with an orientation index in a (h00) plane by Miller indices being set in a range 60 to 100%.

2. A slide member according to claim 1, wherein said orientation index is greater than or equal to 97%.

3. A slide member according to claim 2, wherein said Pb alloy contains 3% (inclusive) to 20% (inclusive) by weight of Sn.

4. A slide member according to claim 3 wherein said Pb alloy contains at most 10% by weight of at least one element selected from the group consisting of Cu, In and Ag.

5. A slide member according to claim 1, wherein said Pb alloy contains 3% (inclusive) to 20% (inclusive) by weight of Sn.

6. A slide member according to claim 5 wherein said Pb alloy contains at most 10% by weight of at least one element selected from the group consisting of Cu, In and Ag.

7. A slide member comprising a surface layer of a Pb alloy on a slide surface for a mating member, wherein said Pb alloy has a crystal form with an orientation index in a (h00) plane by Miller indices being set in a range of 60 to 100%, and the crystals of said Pb alloy are formed into pyramids with the apex of each pyramid being directed to the mating member and each pyramid having a base length d of 8 μm or less.

8. A slide member according to claim 7, wherein the ratio h/d of the height h to the base length d of said pyramid is set in a range of 0.2 to 1.0.

9. A slide member according to claim 8, wherein said Pb alloy contains 3% (inclusive) to 20% (inclusive) by weight of Sn.

10. A slide member according to claim 9 wherein said Pb alloy contains at most 10% by weight of at least one element selected from the group consisting of Cu, In and Ag.

11. A slide member according to claim 7, wherein said Pb alloy contains 3% (inclusive) to 20% (inclusive) by weight of Sn.

12. A slide member according to claim 11 wherein said Pb alloy contains at most 10% by weight of at least one element selected from the group consisting of Cu, In and Ag.

13. A slide member according to claim 7, wherein said orientation index is greater than or equal to 97%.

* * * * *